US012263496B2

(12) United States Patent
Beesley et al.

(10) Patent No.: US 12,263,496 B2
(45) Date of Patent: Apr. 1, 2025

(54) ROTARY ATOMISERS

(71) Applicant: Novanta Technologies UK Limited, Poole (GB)

(72) Inventors: Christopher Beesley, Poole (GB); John Stratton, Poole (GB)

(73) Assignee: NOVANTA TECHNOLOGIES UK LIMITED, Poole (GB)

( * ) Notice: Subject to any disclaimer, the term of this patent is extended or adjusted under 35 U.S.C. 154(b) by 263 days.

(21) Appl. No.: 17/326,629

(22) Filed: May 21, 2021

(65) Prior Publication Data

US 2022/0088624 A1 Mar. 24, 2022

(30) Foreign Application Priority Data

Sep. 22, 2020 (GB) ...................................... 2014947

(51) Int. Cl.
*B05B 3/10* (2006.01)

(52) U.S. Cl.
CPC .......... *B05B 3/1014* (2013.01); *B05B 3/1042* (2013.01)

(58) Field of Classification Search
CPC ....... B05B 3/10; B05B 3/1014; B05B 3/1035; B05B 3/1042; B05B 5/0403; B05B 5/0407; B05B 15/14; B05B 15/18
See application file for complete search history.

(56) References Cited

U.S. PATENT DOCUMENTS 6,592,054 B2 7/2003 Prus
7,041,173 B2 5/2006 Merabet
7,452,421 B2 11/2008 Thome et al.
2007/0090204 A1* 4/2007 Nolte .................... B05B 3/1042 239/600
2010/0206962 A1* 8/2010 Nolte .................... B05B 3/1035 239/223
2010/0282865 A1* 11/2010 Yamada ................ B05B 3/1042 239/289
2012/0132726 A1* 5/2012 Seiz ...................... B05B 3/1064 222/567

FOREIGN PATENT DOCUMENTS

JP H1128391 A 2/1999

OTHER PUBLICATIONS

Search Report for Serial No. GB2014947.2 dated Mar. 3, 2021.

* cited by examiner

*Primary Examiner* — Cody J Lieuwen
(74) *Attorney, Agent, or Firm* — McCormick, Paulding & Huber, PLLC

(57) ABSTRACT

A rotary atomiser spindle arrangement includes a rotary atomiser spindle having a shaft and a bell cup releasably mounted on the shaft. The shaft and mounting portion of the bell cup include respective complimentary taper portions which form an interference fit with each other when the bell cup is mounted on the shaft so locating in the bell cup in relation to the shaft, wherein the rotary atomiser spindle arrangement including a bell cup retention arrangement having retention biasing for urging the complimentary taper portions against one another when the bell cup and shaft are at a first relative rotational position with respect to one another whilst the bell cup retention arrangement allows at least demounting at a second relative rotational position. The bell cup retention arrangement includes latching mechanism for latching the bell cup and shaft in the first relative rotational position.

26 Claims, 6 Drawing Sheets

ROTARY ATOMISERS

CROSS-REFERENCE TO RELATED APPLICATION

This application claims foreign priority benefits under 35 U.S.C. § 119 to British Patent Application No. 2014947.2 filed on Sep. 22, 2020, the content of which is hereby incorporated by reference in its entirety.

TECHNICAL FIELD

This invention relates to rotary atomisers, rotary atomiser spindles and rotary atomiser bell cups.

BACKGROUND

Rotary atomisers are used in various situations for coating surfaces. One particular use of rotary atomisers is the in the field of paint spraying. This, for example, is common in the automotive industry for paint spraying vehicles. In some such cases a rotary atomiser spindle is mounted on a robot arm and this is moved through space and to different orientations in order to spray paint the vehicle. In other cases, different support arrangements may be provided.

More generally, rotary atomisers are used as a paint applicator in high volume production environments. Also called a "paint bell" or "bell applicator" they are preferred for high volume paint application due to superior transfer efficiency, pattern consistency, and low compressed air consumption when compared to paint spray guns.

A bell cup comprises a conical or curved disc fixed to the shaft of a drive spindle which can, for example, be driven by a turbine. Paint is injected into the centre of the rear of the disc and is atomised by being forced out to the edge of the cup by centrifugal forces. The flow of paint over the cup and off the edge breaks up the paint into atomised droplets. Where used, the turbine is a high speed, high precision air motor that rotates the bell cup at speeds ranging from say 10,000 rpm to 100,000 rpm depending on the cup diameter, atomisation desired, and the physical properties of the paint. Typical turbines for this application use an air bearing where the spinning shaft is suspended in the cushion of compressed air with virtually no frictional resistance.

An electrostatic system is typically provided for ensuring efficient coating of the work piece. The electrostatic system can be internal or external (or direct or indirect charge) and arranged to supply a high voltage (say 30,000-100,000V DC) charge to the applicator or the air surrounding it. This has the effect of negatively charging the paint while causing a region of positive charge to form on the work piece resulting in electrostatic attraction between the paint and work piece.

In various environments, for example automotive spraying, reliability and minimal downtime on production lines can be critical. In general, at regular intervals, bell cups need to be cleaned and more occasionally replaced. Typically to do this a spray booth production line has to be stopped to allow maintenance personnel to carry out the cleaning operations and/or to replace a bell cup. Even if automated systems are provided there still tends to be downtime whilst cleaning and/or replacement is carried out.

Conventionally bell cups are screw fitted onto the driving shaft.

This can lead to long removal and replacement times due to the fine pitch screw thread used to secure the bell cups. Further there can be manufacturing problems due to possible mechanical misalignment between the bell cup/shaft threads and location tapers provided on these components which can cause excessive runout and hence vibration at speed. Further it is all too easy to damage/cross threads on bells especially if these are made of relatively soft material such as aluminium.

In an attempt to overcome such problems magnetic click-in systems have been proposed where the bell cup is secured in the shaft using a number of magnets. However, such systems have been found to have significant problems. Noting that the bell cup can be rotated at very high speeds there is a risk of the bell cup being inadequately fixed to the shaft to resist this high speed rotation potentially causing atomiser failure or even the risk of the bell cup flying off the atomiser and causing damage to surrounding items such as a spray booth or a vehicle being sprayed.

Further it has been found that magnets provided in such a system can suffer cracking/failures over time, particularly if run above a designated operational speed either deliberately or accidentally.

Further the provision of such magnets is undesirable because it tends to lead to the need to use heavy and expensive permanent magnet parts in the rotating part of the system, that is to say in the shaft and/or in the bell cup. It is generally undesirable to have any more mass in the rotating part of the system than is strictly necessary. This can lead to increased manufacturing cost and/or speed constraints.

Thus it would be desirable to develop rotary atomiser spindles and bell cups which can be used in a system which looks to alleviate at least some of the above problems.

SUMMARY

According to a first aspect of the present invention there is provided a rotary atomiser spindle arrangement comprising a rotary atomiser spindle having a shaft which is journaled for rotation in a main body of the rotary atomiser spindle and a bell cup releasably mounted on the shaft, the bell cup having a bell portion for spraying media during rotation in use and a mounting portion via which the bell cup is mounted on the shaft, the shaft and mounting portion of the bell cup comprising respective complimentary taper portions which form an interference fit with each other when the bell cup is mounted on the shaft so locating in the bell cup in relation to the shaft, wherein the rotary atomiser spindle arrangement comprises a bell cup retention arrangement having retention biasing means for urging the complimentary taper portions against one another when the bell cup and shaft are at a first relative rotational position with respect to one another whilst the bell cup retention arrangement allows at least demounting of the bell cup from the shaft when the bell cup and shaft are at a second relative rotational position with respect to one another, and the bell cup retention arrangement comprises latching means for latching the bell cup and shaft in the first relative rotational position.

This can give rise to an arrangement where the complimentary taper portions serve to locate the bell cup as desired in relation to the shaft—for example to facilitate concentricity between the shaft and the bell cup, whilst the retention arrangement facilitates effective retention of a carried bell cup and quick release of the bell cup when it is desired to demount the bell cup. The retention biasing means can ensure effective contact between the tapers for alignment and the latching means can guard against unintentional demounting of the bell cup.

In general, and preferably, the bell cup retention arrangement will allow mounting and demounting of the bell cup from the shaft when the bell cup and shaft are at the second relative rotational position with respect to one another. It can be envisaged however that a bell cup retention arrangement might be provided that will allow mounting of the bell cup from the shaft when the bell cup and shaft are at a third relative rotational position with respect to one another, but not when the bell cup and shaft are at the second relative rotational position with respect to one another.

The bell cup retention arrangement may comprise a retention assembly carried on one of the shaft and the bell cup, and comprising the retention biasing means as well as a sleeve having at least one first engaging portion for acting on the other of the shaft and the bell cup under action of the retention biasing means for urging the complimentary taper portions against one another.

Thus it can be noted that in such a case the sleeve is biased in a bell cup retaining direction.

The sleeve may be held against rotation relative to the one of the shaft and the bell cup on which the retention assembly is carried.

The complimentary taper portions may be arranged so that there is an internal taper portion on the shaft and an external taper portion on the bell cup. Although currently less preferred the complimentary taper portions may be arranged so that there is an external taper portion on the shaft and an internal taper portion on the bell cup. It is expected that such an arrangement would typically lead to a greater mass for rotation.

The bell cup retention arrangement may comprise at least one complimentary retention engaging portion provided on said other of the shaft and the bell cup for engaging with the at least one first engaging portion under action of the retention biasing means.

Preferably the retention assembly is carried on the shaft. Preferably the at least one complimentary retention engaging portion is provided on the bell cup.

Where the retention assembly is carried in the shaft, the shaft may comprise a plurality of internal locating projections for limiting axial movement of the sleeve relative to the shaft. The internal locating projections may hold the sleeve against rotation relative to the shaft.

In one set of embodiments the at least one first engaging portion comprises a recess in the sleeve and the at least one complimentary retention engaging portion comprises a projection.

Preferably the sleeve comprises a plurality of first engaging portions and a corresponding plurality of complimentary retention engaging portions are provided on said other of the shaft and the bell cup.

The or each first engaging portion may be provided in an axially facing surface of the sleeve. The sleeve may comprise a ring portion with profiled axially facing surface which defines the or each first engaging portion. The ring portion may comprise, for example, an axial end of sleeve or a flange provided on the sleeve.

The retention assembly may be provided in an annulus defined between the shaft and the mounting portion of the bell cup.

The sleeve may be provided in an annulus defined between the shaft and the mounting portion of the bell cup.

The retention biasing means may be provided in an annulus defined between the shaft and the mounting portion of the bell cup.

The retention biasing means may comprise at least one spring, say a metallic spring. The retention biasing means may comprise a spring pack comprising a plurality of springs. The retention biasing means may comprise a resilient material portion, say of a plastics material, for example one or more 0-rings.

The retention assembly may comprise a biasing means support portion, which may provide a support surface against which the retention biasing means acts when urging the complimentary taper portions against one another. The biasing means support portion may comprise a spring holder having a spring support surface against which the at least one spring acts.

The biasing means support portion may be ring-like and arranged for mounting to the one of the shaft and the bell cup that carries the retention assembly.

The biasing means support portion may be provided in an annulus defined between the shaft and the mounting portion of the bell cup.

The latching means may comprise a latch member and a latch biasing means for biasing the latch member towards a latching position.

The latch member may have at least one detent portion for engaging with a respective complimentary latch engaging portion when the latch member is in the latching position for resisting relative rotation of the shaft and bell cup away from the first relative rotational position.

In one set of embodiments the at least one detent portion comprises a recess and the at least one complimentary latch engaging portion comprises a projection.

The latching member may comprise the sleeve. The detent portion may be provided on the sleeve and the complimentary latch engaging portion may be provided on said other of the shaft and the bell cup.

The or each detent portion may be provided in an axially facing surface of the sleeve. The sleeve may comprise a ring portion with profiled axially facing surface which defines the or each detent portion.

The or each first engaging portion and the or each detent portion may be provided in an axially facing surface of the sleeve. The sleeve may comprise a ring portion with profiled axially facing surface which defines the or each first engaging portion and which defines the or each detent portion.

A common biasing means may be provided to act as both the latch biasing means and the retention biasing means.

This can simplify manufacture and minimise mass in the rotating system.

The at least one detent portion and the at least one first engaging portion may both be provided by a respective common portion of the sleeve.

Said common portion of the sleeve may comprise a recess. In such a case where there is a plurality of detent portions and first engaging portions there will be a plurality of respective recesses.

The at least one complimentary retention engaging portion and the at least one complimentary latch engaging portion may both be provided by a respective common portion of said other of the shaft and the bell cup.

Said common portion of said other of the shaft and the bell cup may comprise a projection. In such a case where there is a plurality of complimentary retention engaging portions and complimentary latch engaging portions there will be a plurality of respective projections.

The retention arrangement may be arranged as a bayonet type of mounting arrangement.

The sleeve may comprise a camming surface leading to the at least one detent portion such that as the bell cup is rotated relative to the shaft towards and away the first relative rotational position, the complimentary latch engaging portion rides over the camming surface towards and away from the detent portion. The camming surface may comprise said profiled axially facing surface.

The detent portion and camming surface may be arranged to allow relative rotation of the bell cup and shaft towards and away from the first relative rotational position towards and away from the second rotational position when under the action of an external twisting force but to resist rotation away from the first relative rotational position towards from the second rotational position in the absence of such force. The external force may be provided by a user or an actuator system such as a robot.

The retention arrangement in general, and where present the detent portion and camming surface, may be arranged to resist relative rotation of the bell cup and shaft in a sense opposite to that needed to move towards the second relative rotational position. This means that relative rotation that might otherwise tend to occur between the bell cup and the shaft due to rotational drive can be resisted. If say a clockwise rotation of the bell cup relative to the shaft is needed to move from the first relative rotational position towards the second rotational position, the retention arrangement will be arranged to hold the bell cup against rotation in an anti-clockwise direction relative to the shaft, and the bell cup will be driven in a clockwise sense such that the drive is acting in the direction where relative rotation is resisted, and in practical terms impossible.

The sleeve may be arranged for axial movement relative to the shaft and the bell cup and against the action of the biasing means during mounting and/or demounting of the bell cup from the shaft.

This can facilitate the complimentary taper portions to fully contact one another during mounting and demounting, in particular in latching and de-latching of the bell cup, so insuring such intimate contact when the bell cup is mounted on the shaft. In such a case as the latch engaging portion rides over the camming surface, the sleeve is forced ("backwards") against the action of the biasing means.

It will be noted that the biasing means in the present systems both acts to retain the bell cup and operate latching. This is an opposite action than a typical bayonet style mounting, such as for a light bulb, where the biasing means effecting latching is driving the held body (light bulb) away from its holder (lamp holder).

The sleeve may have an internal bore.

The internal bore may be for accepting the mounting portion of the bell cup or the shaft.

The internal bore may be for allowing passage of at least one material delivery tube for delivering material to be sprayed to the bell cup.

The sleeve may comprise at least one groove arranged to allow passage of projection acting as at least one of the one complimentary retention engaging portion and the complimentary latch engaging portion from a first end of the sleeve to a second end of the sleeve.

This can facilitate insertion of the shaft or the mounting portion of the bell cup through the sleeve.

The at least one groove may be provided in a surface defining said internal bore.

The at least one groove may be straight and may run parallel to the axis of the sleeve.

An exit of the at least one internal groove may lead to the profiled axially facing surface of the sleeve.

In one set of embodiments the retention assembly is carried on the shaft, the sleeve comprises at least one recess which acts as both the detent portion and the first engaging portion, and the bell cup comprise at least one projection acting as both the complimentary retention engaging portion and the complimentary latch engaging portion and engaging with the recess when the bell cup and shaft are in the first relative rotational position.

According to another aspect of the invention there is provided a rotary atomiser comprising a rotary atomiser spindle arrangement as defined above and a material supply arrangement for supplying material to be sprayed.

The rotary atomiser spindle arrangement may comprise the sleeve as defined above and the material supply arrangement may comprise at least one material supply tube running through a bore in the sleeve.

According to another aspect of the invention there is provided a rotary atomiser spindle arranged for use as part of a rotary atomiser spindle arrangement as defined above.

According to another aspect of the invention there is provided a rotary atomiser shaft arranged for use as part of a rotary atomiser spindle arrangement as defined above.

According to another aspect of the invention there is provided a rotary atomiser spindle having a shaft which is journaled for rotation in a main body of the rotary atomiser spindle and which is arranged to receive a bell cup having a bell portion for spraying media during rotation in use, the shaft comprising a taper portion for receiving a complimentary taper portion of the bell cup when the bell cup is mounted on the shaft so locating in the bell cup in relation to the shaft, wherein the rotary atomiser spindle comprises a bell cup retention assembly having retention biasing means for urging the complimentary taper portions against one another when the bell cup and shaft are at a first relative rotational position with respect to one another whilst the bell cup retention assembly allows at least demounting of the bell cup from the shaft when the bell cup and shaft are at a second relative rotational position with respect to one another, and the bell cup retention assembly comprises latching means for latching the bell cup and shaft in the first relative rotational position.

According to another aspect of the invention there is provided a rotary atomiser shaft arrangement comprising a rotary atomiser shaft which is arranged to be journaled for rotation in a main body of a rotary atomiser spindle and which is arranged to receive a bell cup having a bell portion for spraying media during rotation in use, the shaft comprising a taper portion for receiving a complimentary taper portion of the bell cup when the bell cup is mounted on the shaft so locating in the bell cup in relation to the shaft, wherein the rotary atomiser shaft arrangement further comprises a bell cup retention assembly mounted in the shaft and having retention biasing means for urging the complimentary taper portions against one another when the bell cup and shaft are at a first relative rotational position with respect to one another whilst the bell cup retention assembly allows at least demounting of the bell cup from the shaft when the bell cup and shaft are at a second relative rotational position with respect to one another, and the bell cup retention assembly comprises latching means for latching the bell cup and shaft in the first relative rotational position.

The retention assembly may comprise a sleeve having at least one first engaging portion for acting on a carried bell cup under action of the retention biasing means for urging the complimentary taper portions against one another.

According to another aspect of the invention there is provided a rotary atomiser shaft arrangement comprising a rotary atomiser shaft which is arranged to be journaled for rotation in a main body of a rotary atomiser spindle and which is arranged to receive a bell cup having a bell portion for spraying media during rotation in use, the shaft comprising a taper portion for receiving a complimentary taper portion of the bell cup when a bell cup is mounted on the shaft so locating in the bell cup in relation to the shaft, wherein the rotary atomiser shaft arrangement further comprises a bell cup retention assembly mounted in the shaft, the retention assembly comprising retention biasing means and a sleeve having at least one detent portion for receiving a retention lug provided on a carried bell cup and holding the carried bell cup against rotation relative to the shaft, wherein the retention biasing means acts on the sleeve so as to draw the sleeve into the shaft for holding the retention lug of a carried bell cup in the detent portion and urging a carried bell cup into the shaft.

According to another aspect of the invention there is provided a rotary bell cup arranged for use as part of a rotary atomiser spindle arrangement as defined above.

According to another aspect of the invention there is provided a rotary atomiser bell cup for mounting on a shaft of a rotary atomiser spindle as defined above and having a bell portion for spraying media during rotation in use and a mounting portion via which the bell cup is to be mounted on the shaft and which includes a taper portion for forming an interference fit with a complimentary taper portion on the shaft, wherein the bell cup further comprises at least one projection arranged to act as a complimentary retention engaging portion and a complimentary latch engaging portion.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

BRIEF DESCRIPTION OF THE DRAWINGS

Embodiments of the present invention will now be described, by way of example only, with reference to the accompanying drawings in which.

DETAILED DESCRIPTION

Figure 1:
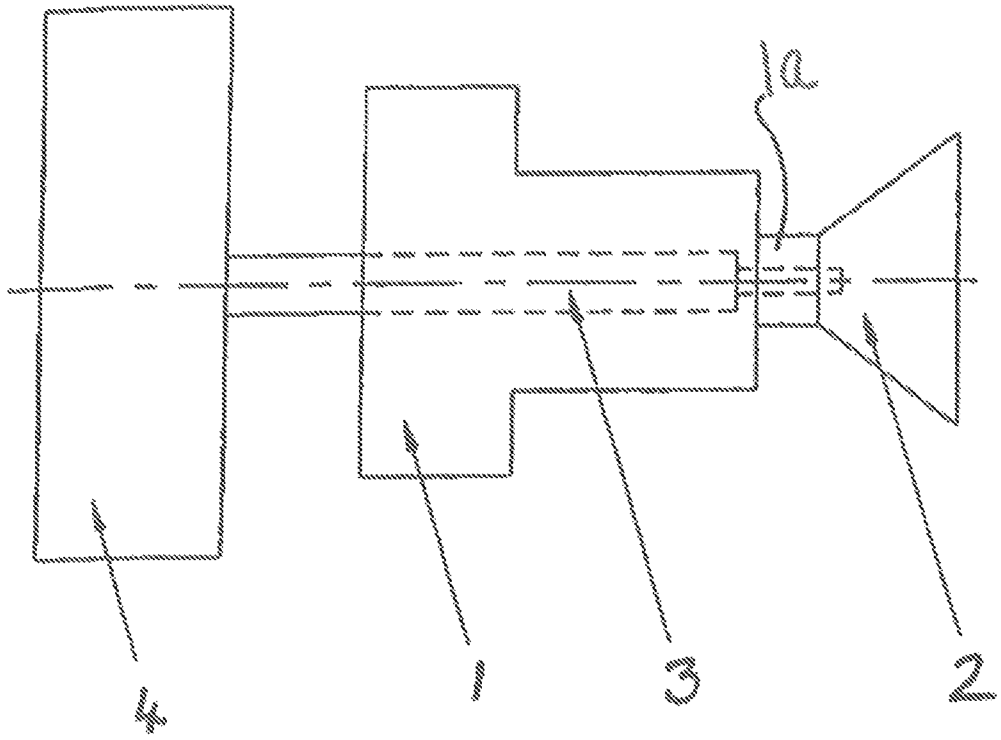
FIG. 1 schematically shows a rotary atomiser in the form of a paint sprayer.
Figure 2:
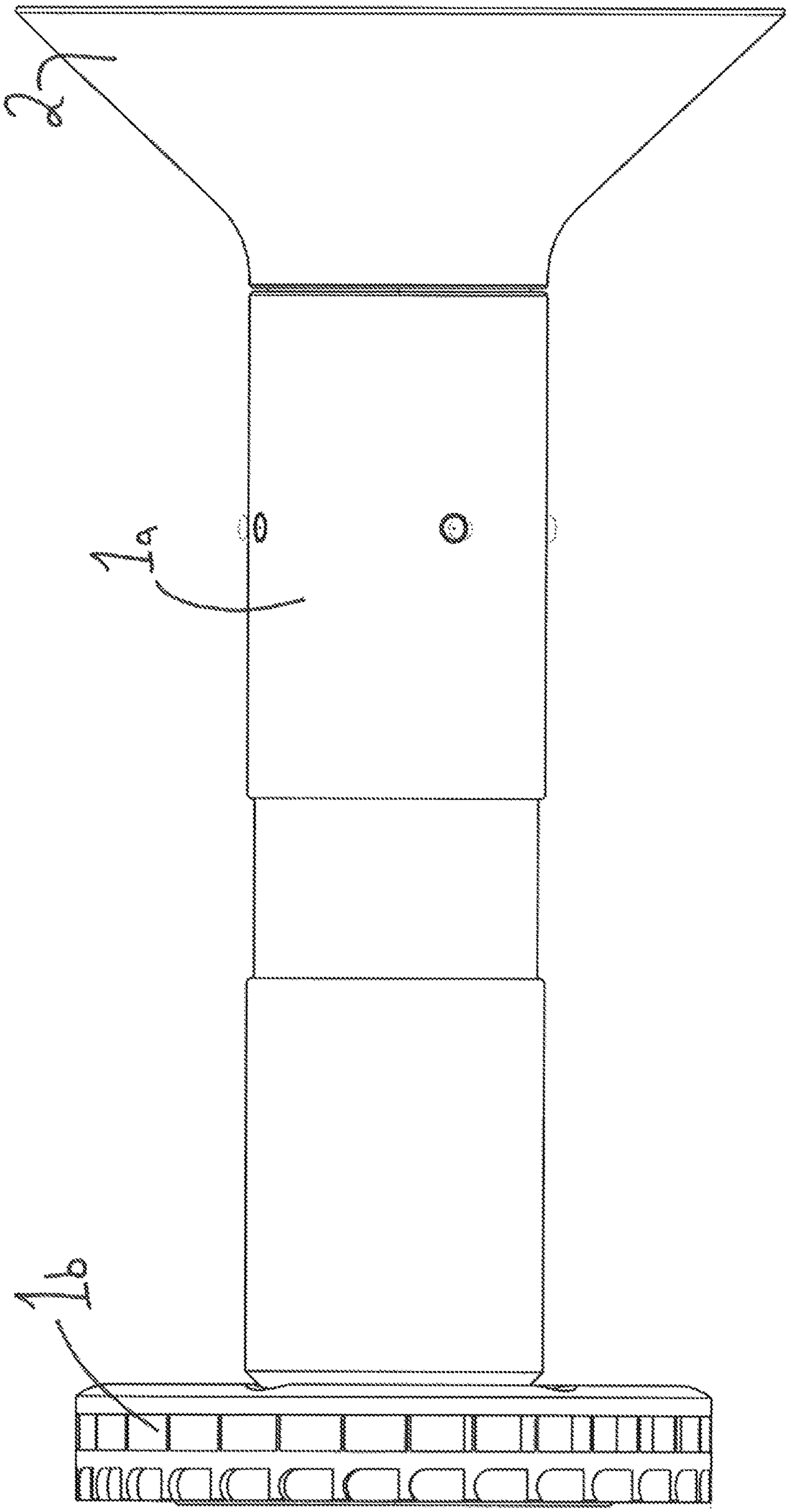
FIG. 2 schematically shows, in isolation, a rotary atomiser spindle arrangement of the rotary atomiser shown in FIG. 1.
Figure 3:
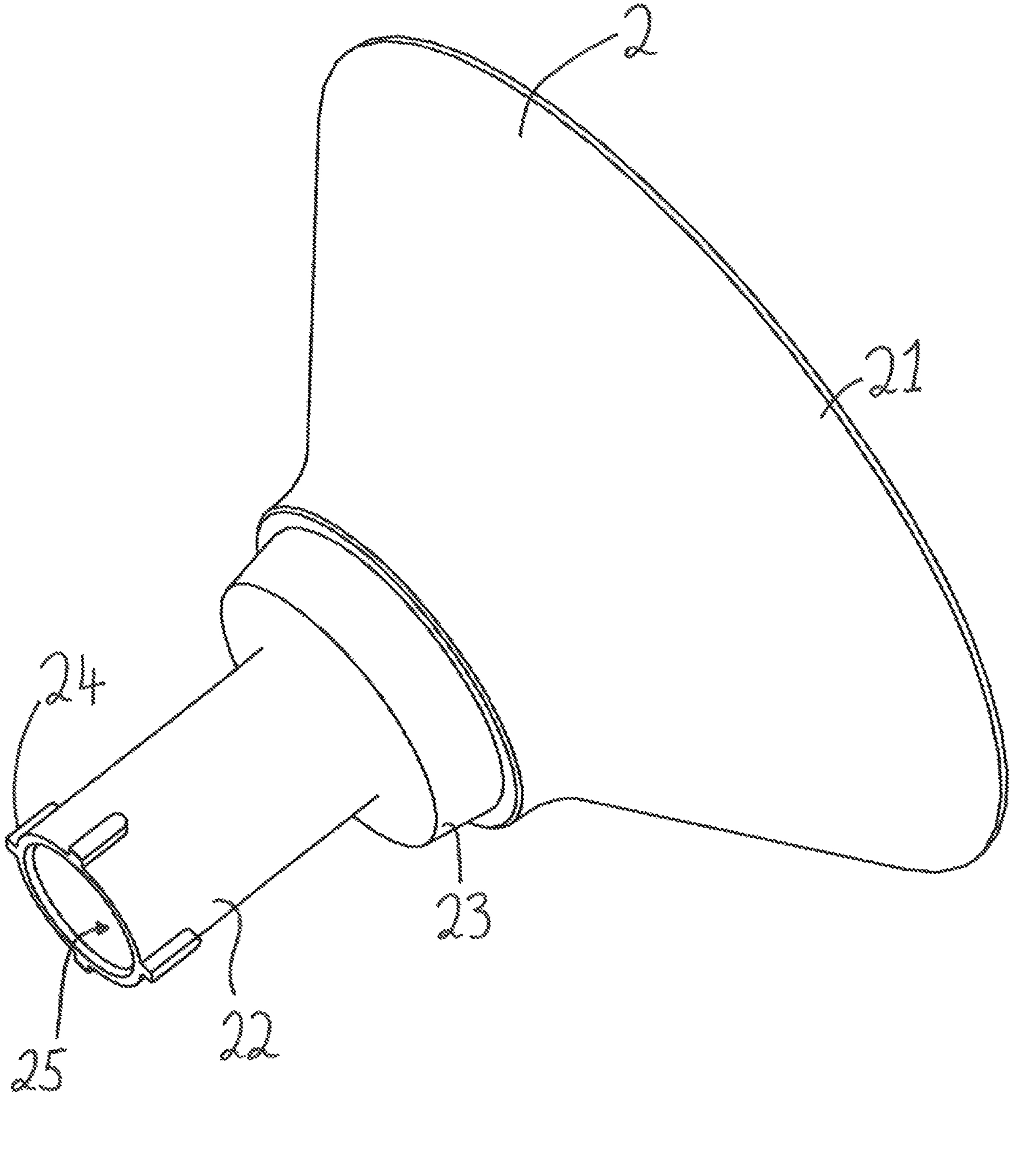
FIG. 3 schematically shows a bell cup of the type included in the rotary atomiser of FIG. 1 and rotary atomiser spindle arrangement of FIG. 2 but in isolation.
Figure 4:
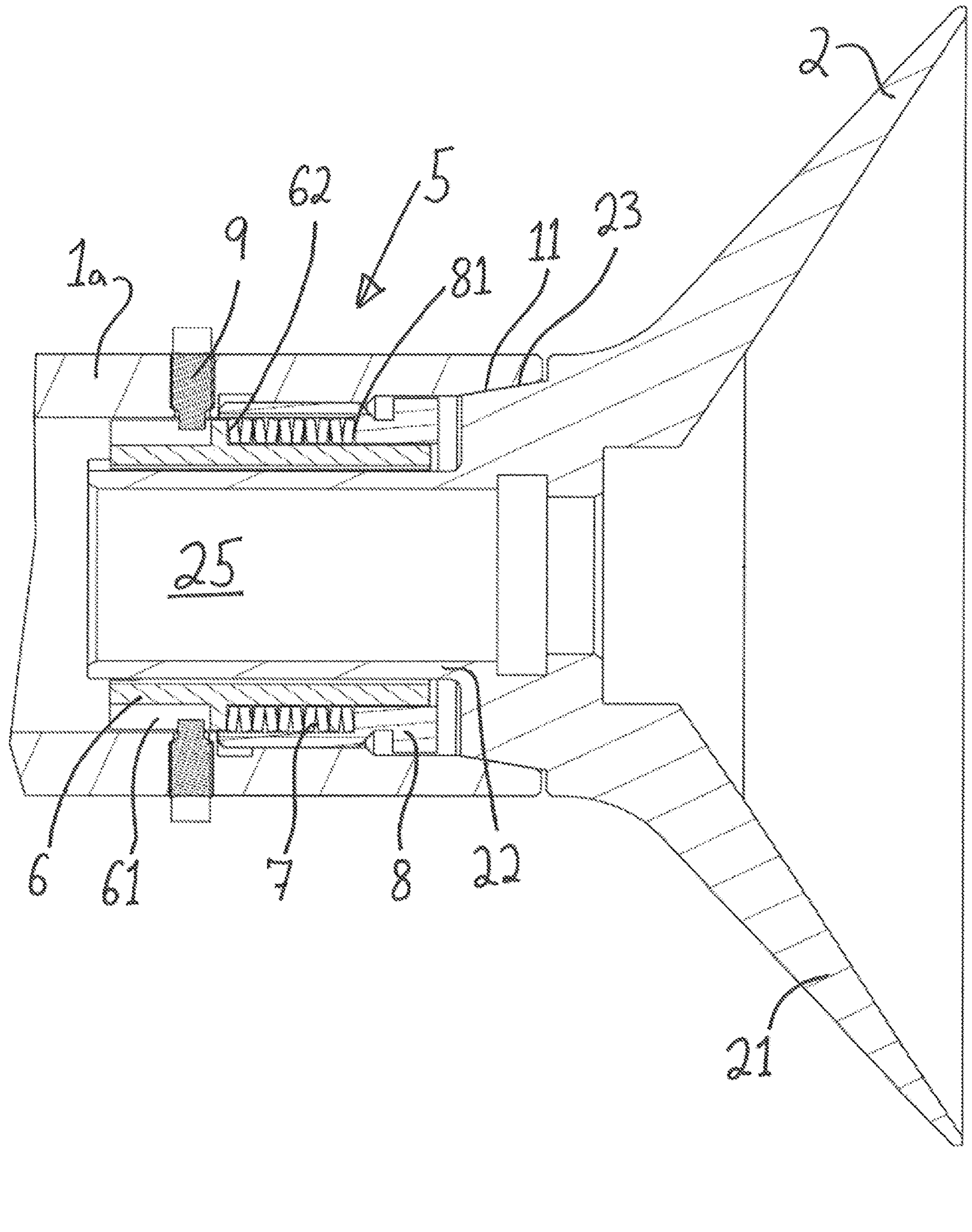
FIG. 4 is a sectional view of a portion of the rotary atomiser spindle arrangement shown in FIG. 2 showing internal detail including detail of a bell cup retention arrangement.

FIG. 1 schematically shows a rotary atomiser in the form of a paint sprayer which comprises a rotor atomiser spindle 1 and a paint spraying bell cup 2. Together the rotary atomiser spindle 1 and paint spraying bell cup 2 can be considered to be a rotary atomiser spindle arrangement. The rotary atomiser spindle 1 is arranged for rotatingly driving the paint spraying bell cup 2. The spindle 1 comprises a shaft 1*a* which is journaled in at least one air bearing (not shown) and carries a turbine wheel 1*b* (which is visible in FIG. 2), for rotational drive of the shaft 1*a* under action of drive gas.

The paint sprayer shown in FIG. 1 also comprises a supply arrangement 3 for supplying material, i.e. paint in this case, from a reservoir 4 towards the bell cup 2 so that this paint may be atomised by the bell cup 2 and projected towards the surface which is to be coated with the paint. As is typical with paint sprayers such as this, paint is projected towards the surface to be painted by electrostatic force created by a high voltage applied between the spindle 1 and the surface to be painted.

Note that in alternatives, other forms of drive beside turbine drive may be used, for example the shaft may be electrically driven.

The structure and operation of the paint sprayer at this level is conventional and such paint sprayers are widely used in the art and well understood. It is the features of the rotary atomiser spindle arrangement and in particular the mounting arrangement for mounting the bell cup 2 on the rotary atomiser spindle 1 which are of particular interest in the present application. These features will be described in more detail below, with particular reference to FIGS. 2 to 6.

The bell cup 2 is a replaceable component which is arranged to be releasably mountable on the rotary atomiser spindle 1 and in particular on the shaft 1*a*. The bell cup 2 can be seen in isolation in FIG. 3 and can be seen mounted to the shaft 1*a* in FIGS. 1,2 and 4.

The bell cup 2 comprises a bell portion 21 for spraying media whilst being rotated and a mounting portion 22 for use in mounting the bell cup 2 on the shaft 1*a*. The mounting portion 22 comprises a taper portion 23, that is to say a part conical surface, which is arranged to mate, that is to form an interference fit, with a corresponding complimentary taper portion 11 provided in the end of the shaft 1*a* (see FIG. 4).

In this embodiment the taper portion 23 on the bell cup 2 is an external taper and the taper in the shaft 11 is an internal taper. However, in an alternative, these two may be reversed such that there is an external taper on the shaft 1*a* and in internal taper provided on the bell cup 2. However, it is expected that such an arrangement will lead to increased mass in the rotating system and thus in most circumstances this is probably less preferred.

The bell cup 2 further comprises a plurality, in this embodiment four, retention lugs 24. In this embodiment these retention lugs 24 are provided at a distal end of the mounting portion 22. The retention lugs 24 form part of a retention arrangement as will be described in more detail below.

The shaft 1*a* in this embodiment houses a retention assembly 5. This retention assembly 5 is arranged to interact with retention lugs 24 and together these components can be considered to form a bell cup retention arrangement.

The retention assembly 5 is provided in the main bore of the shaft 1*a* and when the bell cup 2 is mounted in the shaft 1*a* a main portion of the mounting portion 22 of the bell cup 2 extends through the retention assembly 5. Thus the retention assembly is provided in an annulus defined between the shaft 1*a* and the bell cup 2. This arrangement leaves an inner main bore 25 of the bell cup 2, which extends through the mounting portion 22, unobstructed such that one or more feed tubes (not shown) which form part of the supply arrangement 3 may pass through the rotary atomiser spindle 1 and bell cup 2 to supply material to be sprayed to the bell cup 2.

The bell cup retention assembly comprises a sleeve 6, biasing means, which in this embodiment is in the form of a spring pack 7, and a spring holder portion 8.

A plurality of (in this embodiment, four, of which two can be seen in FIG. 4) retaining screws 9 are provided in the shaft 1*a* as inwardly projecting portions for controlling the extent of axial movement possible for the sleeve 6 as well as holding the sleeve 6 against rotational movement within the shaft 1*a*. The respective end of each of the retaining screws 9 is received in a respective slot 61 provided in the sleeve 6. By consideration of say FIGS. 4 and 5B it will be seen how these retaining screws 9 resist relative rotation between the shaft 1*a* and the sleeve 6 whilst allowing a range of axial movement of the sleeve 6. Interaction of the screws 9 with the side walls of the slots 61 holds against rotation, whilst, interaction of the screws 9 with the closed ends of the slots 61 limits axial travel.

The biasing means (that is the spring pack 7 in this embodiment) is housed between a flange 62 provided on the sleeve 6 and a biasing means (or spring) support surface 81 provided on the spring holder 8. The spring holder 8 is a ring-like component as can be best seen in FIG. 6. The spring holder 8 has an outer threaded portion 82 which is arranged to be received in a complimentary threaded portion in the end of the shaft 1*a*.

Thus in assembly with the retaining screws 9 in position, the sleeve 6 may be first introduced into the end of the shaft 1*a* then the spring pack 7 located around the sleeve 6, that is in the annulus formed between the sleeve 6 and inner wall of the shaft 1*a*, and then the spring holder 8 screwed into position so capturing the spring pack 7 between the spring holder 8 and the sleeve 6 with it acting between the flange 62 of the sleeve 6 and the biasing means support surface 81.

In this assembled state axial movement of the sleeve 6 in a first direction is stopped when the ends of the slots 61 meet the retention screws 9 and axial movement in the opposition direction is opposed by the biasing means, that is by the spring pack 7. However, the sleeve 6 is able to move axially over a certain range provided the force of the biasing means 7 is overcome.

Figure 5A:
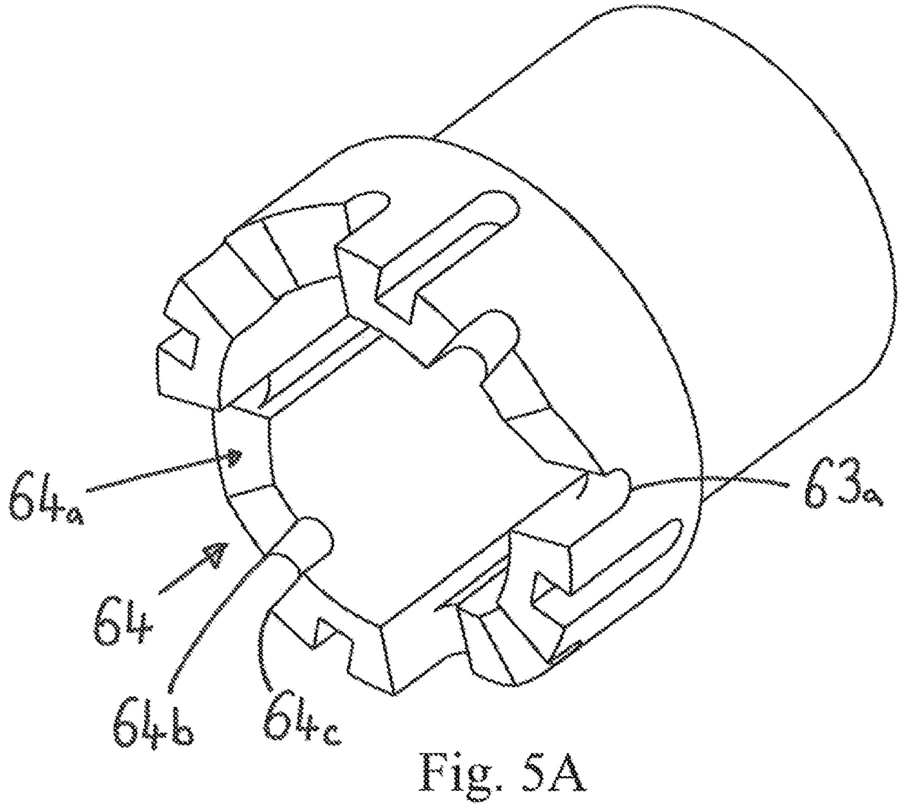
FIGS. 5A and 5B show perspective views of a sleeve which forms part of the bell cup retention arrangement shown in FIG. 4.
Figure 5B:
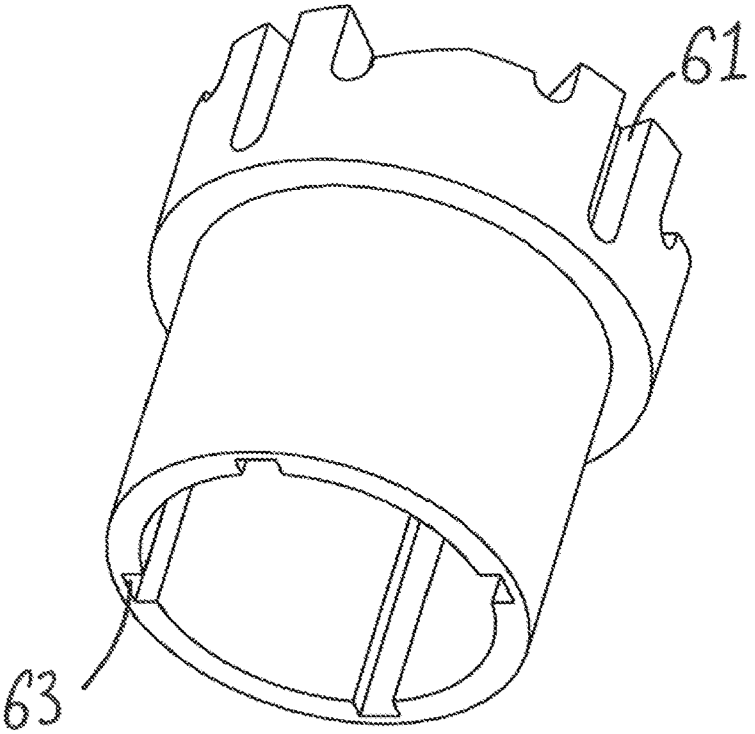
Figure 6:
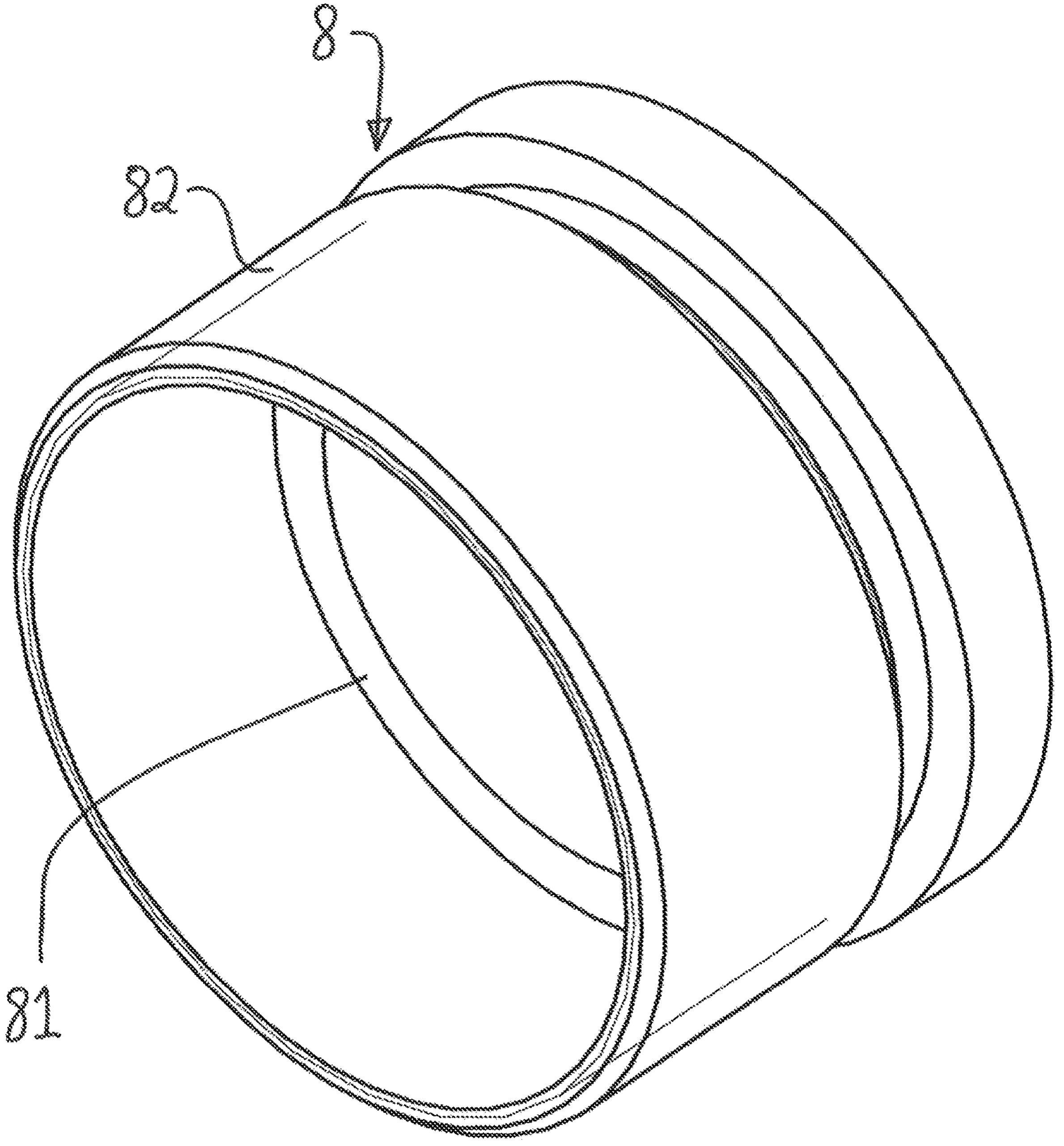
FIG. 6 shows a spring holder which forms part of the bell cup retention arrangement shown in FIG. 4.

As best seen in FIGS. 5A and 5B the sleeve 6 also comprises a plurality of (in this embodiment four) internal grooves 63 provided in a wall defining the bore of the sleeve 6. In the present embodiment the internal grooves 63 are substantially straight and run parallel to the axis of the sleeve 6. The grooves 63 are arranged for receiving the retention lugs 24 provided on the bell cup 2 when the bell cup 2 is being mounted on the shaft 1*a*. As this mounting is carried out, the retention lugs 24 travel along their respective groove 63. When the bell cup 2 is fully inserted along this path each retention lug 24 reaches a respective exit point 63*a* (see FIG. 5A) of the groove 63 along which it has been travelling. This exit point 63*a* opens out into an axially facing profiled end surface 64 of the sleeve 6. In the present embodiment there are four such exit portions 63*a* (one for each groove 63) and the profiled axially facing surface of the sleeve 64 comprises a plurality of (in this embodiment four) camming surfaces 64*a* each of which leads from a respective exit point 63*a* of the grooves 63 to a respective detent portion 64*b*. In this embodiment there are four detent portions 64*b*. The camming surfaces 64*a* are arranged so that the respective retention lug 64 may, when rotationally driven, ride over the camming surface 64*a* and into the respective detent portion 64*b*. Further rotational travel of each lug 24 in that direction is prevented by a respective shoulder portion 64*c*.

This arrangement allows rotational movement of the bell cup 2 relative to the sleeve 6 and hence shaft 1*a* such that the bell cup 2 may be twist locked into position. In the present embodiment, approximately ⅛$^{th}$ of a turn is required to move the retention lugs 24 from the exit 63*a* of the respective groove 63 to the respective detent portion 64*b*. As this twisting takes place the bell cup 2 will tend to be drawn further into the shaft 1*a* to the point where the complimentary taper portions 23 and 11 are intimately in contact with one another. Beyond this point further rotation of the bell cup 2 relative to the shaft 1 will tend to drive the sleeve 6 backwards against the action of the biasing means 7 as the retention lugs 24 ride over the camming surfaces 64*a* and into the respective detent portion 64*b*.

Once this rotation has taken place and the retention lugs 24*b* are located in the detent portions 64*b*, the biasing means, that is spring pack 7, serves to tend to draw the bell cup 2 into the shaft 1*a* and load the complimentary taper portions 23 and 11 against one another. In this way correct location of the bell cup 2 and for example, good concentricity between the bell cup 2 and the shaft 1*a*, can be achieved by the interactions of the tapers 23, 11 whilst retention of the bell cup 2 is ensured by the retention arrangement—that is the retention assembly 5 and the retention lugs 24. The load acting on the bell cup 2 can be controlled by suitably selecting the biasing means—eg selecting the strength of the springs.

The shaft 1*a* and the bell cup 2 are also latched by the sleeve 6 and biasing means (spring pack 7) in this relative rotational position.

Further as rotational drive is transferred between the shaft 1*a* and bell cup 2 in operation, this rotational load can be transferred from the shaft 1*a* to the bell cup 2 both via the frictional forces at the interference fit between the complimentary tapers 23,11 and also by the shoulder 64*c* associated with each detent portion 64*b* acting on the respective retention lug 24.

It will be noted that the sleeve 6 and biasing means (spring pack 7) are acting both as part of the retention system—i.e. biasing the bell cup 2 into the shaft 1*a* and as part of a latching means with the sleeve 6 acting as a latch member. The retention lugs 24 act both as latch engaging portions and retention engaging portions.

In demounting the bell cup 2 from the shaft 1*a* rotation of the bell cup 2 with a significant rotational force (but one that can manually applied) in the direction opposite to that used to mount it is required to overcome the force of biasing means. At this stage rotation of the bell cup 2 and corresponding rotation of the retention lugs 24 will drive the sleeve 6 backwards against the biasing means, that is the spring pack 7, as the lugs 24 escape from the detent portions 64*b* and run over the camming surfaces 64*a*. From there the lugs 24 can re-enter the grooves 63 in the sleeve 6 such that the bell cup 2 may be removed from the shaft 1*a*.

Whilst mounting and demounting the bell cup 2, the shaft 1*a* can be held still if desired in a number of different ways. For example, the shaft 1*a* may be provided with two shaft flats (not shown) which can be held with a spanner, or as another example a shaft locking mechanism (not shown) may be engaged with the shaft 1*a*.

Whilst an arrangement as described above in which the bell cup retention assembly is carried in the shaft 1*a* is preferred, systems can be envisaged where the situation may be reversed and the bell cup retention assembly might be carried in the bell cup 2 and appropriate retention lugs provided on the shaft 1*a*. In most circumstances this would seem to be less preferred as it would tend to increase the complexity and cost of each bell cup 2 which is of course intended to be replaced from time to time.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A rotary atomiser spindle arrangement comprising a rotary atomiser spindle having a shaft which is journaled for rotation in a main body of the rotary atomiser spindle and a bell cup releasably mounted on the shaft, the bell cup having a bell portion for spraying media during rotation in use and a mounting portion via which the bell cup is mounted on the shaft, the shaft and mounting portion of the bell cup comprising respective complimentary taper portions which form an interference fit with each other when the bell cup is mounted on the shaft so locating in the bell cup in relation to the shaft, wherein the rotary atomiser spindle arrangement comprises a bell cup retention arrangement having retention biasing means for urging the complimentary taper portions against one another when the bell cup and shaft are at a first relative rotational position with respect to one another whilst the bell cup retention arrangement allows at least demounting of the bell cup from the shaft when the bell cup and shaft are at a second relative rotational position with respect to one another, and the bell cup retention arrangement comprises latching means for latching the bell cup and shaft in the first relative rotational position, wherein the latching means comprises a latch member and a latch biasing means for biasing the latch member towards a latching position, the latch member having at least one detent portion for engaging with a respective complimentary latch engaging portion when the latch member is in the latching position for resisting relative rotation of the shaft and bell cup away from the first relative rotational position, wherein the bell cup retention arrangement comprises a retention assembly carried on one of the shaft and the bell cup, and comprising the retention biasing means as well as a sleeve having at least one first engaging portion for acting on the other of the shaft and the bell cup under action of the retention biasing means for urging the complimentary taper portions against one another and in which the latch member comprises the sleeve, the detent portion is provided on the sleeve and the complimentary latch engaging portion is provided on said other of the shaft and the bell cup, wherein the sleeve comprises a camming surface on an axially facing surface of the sleeve, the axially facing surface being distal from the bell portion of the bell cup, the camming surface leading to the at least one detent portion, and wherein as the bell cup is rotated relative to the shaft towards and away from the first relative rotational position, the complimentary latch engaging portion rides over the camming surface towards and away, respectively, from the detent portion, the camming surface being inclined such that when the bell cup is rotated from the second relative position to the first relative position the latch engaging portion rides over the camming surface towards the detent portion such that the bell cup is drawn towards the shaft until the complimentary taper portions are in contact, further rotation drives the sleeve towards the bell cup against the action of the retention biasing means, thus enabling the latching position to be reached.

2. The rotary atomiser spindle arrangement according to claim 1 in which the sleeve is held against rotation relative to the one of the shaft and the bell cup on which the retention assembly is carried.

3. The rotary atomiser spindle arrangement according to claim 2 in which the retention assembly is carried in the shaft and the shaft comprises a plurality of internal locating projections for limiting axial movement of the sleeve relative to the shaft and holding the sleeve against rotation relative to the shaft.

4. The rotary atomiser spindle arrangement according to claim 1 in which the bell cup retention arrangement comprises at least one complimentary retention engaging portion provided on said other of the shaft and the bell cup for engaging with the at least one first engaging portion under action of the retention biasing means.

5. The rotary atomiser spindle arrangement according to claim 4 in which the retention assembly is carried on the shaft and the at least one complimentary retention engaging portion is provided on the bell cup.

6. The rotary atomiser spindle arrangement according to claim 4 in which the at least one first engaging portion comprises a recess in the sleeve and the at least one complimentary retention engaging portion comprises a projection.

7. The rotary atomiser spindle arrangement according to claim 4 in which the sleeve comprises a plurality of first engaging portions and a corresponding plurality of complimentary retention engaging portions are provided on said other of the shaft and the bell cup.

8. The rotary atomiser spindle arrangement according to claim 1 in which the or each first engaging portion is provided on an axially facing surface of the sleeve.

9. The rotary atomiser spindle arrangement according to claim 1 in which the retention assembly is provided in an annulus defined between the shaft and the mounting portion of the bell cup.

10. The rotary atomiser spindle arrangement according to claim 1 in which the at least one detent portion comprises a recess and the at least one complimentary latch engaging portion comprises a projection.

11. The rotary atomiser spindle arrangement according to claim 1 in which the at least one detent portion and the at least one first engaging portion are both provided by a respective common portion of the sleeve.

12. The rotary atomiser spindle arrangement according to claim 1 in which the detent portion and camming surface are arranged to allow relative rotation of the bell cup and shaft towards the first relative rotational position from the second rotational position and towards the second relative rotational position from the first rotational position when under the action of an external twisting force but to resist rotation away from the first relative rotational position towards from the second rotational position in the absence of such force.

13. The rotary atomiser spindle arrangement according to claim 1 in which a common biasing means is provided to act as both the latch biasing means and the retention biasing means.

14. The rotary atomiser spindle arrangement according to claim 1 in which the retention arrangement is arranged to hold the bell cup and shaft against relative rotation in a sense opposite to that needed to move towards the second relative rotational position from the first relative rotational position.

15. The rotary atomizer spindle arrangement according to claim 1 in which the sleeve comprises at least one groove arranged to allow passage of projection acting as at least one of a complimentary retention engaging portion and a complimentary latch engaging portion from a first end of the sleeve to a second end of the sleeve.

16. The rotary atomizer spindle arrangement according to claim 1 in which the bell cup retention arrangement comprises at least one complimentary retention engaging portion provided on said other of the shaft and the bell cup for engaging with the at least one first engaging portion under action of the retention biasing means and in which the retention assembly is carried on the shaft, the sleeve comprises at least one recess which acts as both the detent portion and the first engaging portion, and the bell cup comprises at least one projection acting as both the complimentary retention engaging portion and the complimentary latch engaging portion and engaging with the recess when the bell cup and shaft are in the first relative rotational position.

17. A rotary atomiser comprising a rotary atomiser spindle arrangement according to claim 1 and a material supply arrangement for supplying material to be sprayed.

18. The rotary atomizer spindle arrangement according to claim 1 wherein the retention biasing means and the sleeve are positioned inside the shaft.

19. The rotary atomizer spindle arrangement according to claim 18 wherein the retention biasing means is arranged around the sleeve.

20. The rotary atomizer spindle arrangement according to claim 19 wherein the sleeve has a flange portion and the retention biasing means urges against said flange portion when the bell cup is mounted on the shaft.

21. The rotary atomizer spindle arrangement according to claim 1 wherein the sleeve comprises slots and the shaft comprises locking screws which interact with the slots to limit axial movement of the sleeve relative to the shaft and prevent relative rotation of the sleeve and the shaft.

22. The rotary atomizer spindle arrangement according to claim 1 wherein the bell cup mounting portion comprises an elongate portion and the sleeve comprises an internal bore through the length of the sleeve, wherein the elongate portion of the mounting position passes through said bore during mounting.

23. A rotary atomiser spindle arrangement comprising a rotary atomiser spindle having a shaft which is journaled for rotation in a main body of the rotary atomiser spindle and a bell cup releasably mounted on the shaft, the bell cup having a bell portion for spraying media during rotation in use and a mounting portion via which the bell cup is mounted on the shaft, the shaft and mounting portion of the bell cup comprising respective complimentary taper portions which form an interference fit with each other when the bell cup is mounted on the shaft so locating in the bell cup in relation to the shaft, the mounting portion further comprising an elongate portion provided with at least one retention engaging portion at a distal end of the mounting portion, wherein the rotary atomiser spindle arrangement comprises a bell cup retention arrangement having retention biasing means for urging the complimentary taper portions against one another when the bell cup and shaft are at a first relative rotational position with respect to one another whilst the bell cup retention arrangement allows at least demounting of the bell cup from the shaft when the bell cup and shaft are at a second relative rotational position with respect to one another, and the bell cup retention arrangement comprises latching means for latching the bell cup and shaft in the first relative rotational position, wherein the latching means comprises a latch member and a latch biasing means for biasing the latch member towards a latching position, the latch member having at least one detent portion for engaging with a respective complimentary latch engaging portion when the latch member is in the latching position for resisting relative rotation of the shaft and bell cup away from the first relative rotational position, wherein the bell cup retention arrangement comprises a retention assembly carried on one of the shaft and the bell cup, and comprising the retention biasing means as well as a sleeve having at least one first engaging portion for acting on the other of the shaft and the bell cup under action of the retention biasing means for urging the complimentary taper portions against one another, wherein the at least one first engaging portion is provided on an axially facing surface at an end of the sleeve distal from the bell portion of the bell cup and in which the latch member comprises the sleeve, the detent portion is provided on said distal axially facing surface of the sleeve and the complimentary latch engaging portion is provided on said other of the shaft and the bell cup, the sleeve further comprising an internal bore through the length of the sleeve, wherein the elongate portion of the mounting position passes through said bore during mounting such that the at least one retention engaging portion engages with the first engaging portion, wherein the sleeve comprises a camming surface on said distal axially facing surface of the sleeve, the camming surface leading to the at least one detent portion, and wherein as the bell cup is rotated relative to the shaft towards and away from the first relative rotational position, the complimentary latch engaging portion rides over the camming surface towards and away, respectively, from the detent portion, the camming surface being inclined such that when the bell cup is rotated from the second relative position to the first relative position the latch engaging portion rides over the camming surface towards the detent portion such that the bell cup is drawn towards the shaft until the complimentary taper portions are in contact, further rotation drives the sleeve towards the bell cup against the action of the retention biasing means, thus enabling the latching position to be reached.

24. A rotary atomiser spindle arrangement comprising a rotary atomiser spindle having a shaft which is journaled for rotation in a main body of the rotary atomiser spindle and a bell cup releasably mounted on the shaft, the bell cup having a bell portion for spraying media during rotation in use and a mounting portion via which the bell cup is mounted on the shaft, the shaft and mounting portion of the bell cup comprising respective complimentary taper portions which form an interference fit with each other when the bell cup is mounted on the shaft so locating in the bell cup in relation to the shaft, wherein the rotary atomiser spindle arrangement comprises a bell cup retention arrangement having retention biasing means for urging the complimentary taper portions against one another when the bell cup and shaft are at a first relative rotational position with respect to one another whilst the bell cup retention arrangement allows at least demounting of the bell cup from the shaft when the bell cup and shaft are at a second relative rotational position with respect to one another, and the bell cup retention arrangement comprises latching means for latching the bell cup and shaft in the first relative rotational position, wherein the latching means comprises a latch member and a latch biasing means for biasing the latch member towards a latching position, the latch member having at least one detent portion for engaging with a respective complimentary latch engaging portion when the latch member is in the latching position for resisting relative rotation of the shaft and bell cup away from the first relative rotational position, wherein the bell cup retention arrangement comprises a retention assembly carried on one of the shaft and the bell cup, and comprising the retention biasing means as well as a sleeve having at least one first engaging portion for acting on the other of the shaft and the bell cup under action of the retention biasing means for urging the complimentary taper portions against one another and in which the latch member comprises the sleeve, the detent portion is provided on the sleeve and the complimentary latch engaging portion is provided on said other of the shaft and the bell cup, and wherein the retention biasing means and sleeve are positioned inside the shaft.

25. The rotary atomiser spindle arrangement according to claim 24 wherein the retention biasing means is arranged around the sleeve.

26. A rotary atomiser spindle arrangement comprising a rotary atomiser spindle having a shaft which is journaled for rotation in a main body of the rotary atomiser spindle and a bell cup releasably mounted on the shaft, the bell cup having a bell portion for spraying media during rotation in use and a mounting portion via which the bell cup is mounted on the shaft, the shaft and mounting portion of the bell cup comprising respective complimentary taper portions which form an interference fit with each other when the bell cup is mounted on the shaft so locating the bell cup in relation to the shaft, the mounting portion further comprising a latch engaging portion, wherein the rotary atomiser spindle arrangement comprises a bell cup retention arrangement having retention biasing means for urging the complimentary taper portions against one another when the bell cup and shaft are at a first relative rotational position with respect to one another whilst the bell cup retention arrangement allows at least demounting of the bell cup from the shaft when the bell cup and shaft are at a second relative rotational position with respect to one another, wherein the bell cup retention arrangement comprises a retention assembly carried on one of the shaft and the bell cup comprising the retention biasing means and a sleeve having a camming surface on an axially facing surface, said axially facing surface being distal from the bell portion of the bell cup, the camming surface leading to at least one detent portion, and wherein as the bell cup is rotated relative to the shaft towards and away from the first relative rotational position, the latch engaging portion rides over the camming surface towards and away, respectively, from the detent portion, the camming surface being inclined such that when the bell cup is rotated from the second relative position to the first relative position the latch engaging portion rides over the camming surface towards the detent portion such that the bell cup is drawn towards the shaft until the complimentary taper portions are in contact and further rotation drives the sleeve towards the bell cup against the action of the retention biasing means, thus enabling a latch position to be reached.

* * * * *